US012560416B2

(12) United States Patent
Jeon et al.

(10) Patent No.: US 12,560,416 B2
(45) Date of Patent: Feb. 24, 2026

(54) METHOD AND DEVICE FOR PROVIDING ENGAGEMENT INFORMATION BASED ON OCCURRENCE OF NON-LINEAR MANEUVER OF AIRCRAFT, AND STORAGE MEDIUM STORING INSTRUCTIONS TO PERFORM METHOD FOR PROVIDING ENGAGEMENT INFORMATION

(71) Applicant: AGENCY FOR DEFENSE DEVELOPMENT, Daejeon (KR)

(72) Inventors: Hocheol Jeon, Daejeon (KR); Hyoek Jin Choi, Daejeon (KR); Jae Kak Choi, Daejeon (KR); Young Min Kim, Daejeon (KR)

(73) Assignee: Agency for Defense Development, Daejeon (KR)

( * ) Notice: Subject to any disclaimer, the term of this patent is extended or adjusted under 35 U.S.C. 154(b) by 0 days.

(21) Appl. No.: 18/781,312

(22) Filed: Jul. 23, 2024

(65) Prior Publication Data

US 2025/0277656 A1 Sep. 4, 2025

(30) Foreign Application Priority Data

Mar. 4, 2024 (KR) ........................ 10-2024-0030507

(51) Int. Cl.
*F42B 15/01* (2006.01)
*F41G 7/00* (2006.01)
*G08G 5/21* (2025.01)

(52) U.S. Cl.
CPC .............. *F42B 15/01* (2013.01); *F41G 7/002* (2013.01); *G08G 5/21* (2025.01)

(58) Field of Classification Search
CPC ............ F42B 15/01; G08G 5/21; F41G 7/002
See application file for complete search history.

(56) References Cited

U.S. PATENT DOCUMENTS 9,677,864 B1 * 6/2017 Jankowski .............. F42B 10/32
10,715,781 B1 * 7/2020 Bielas ..................... F41G 7/002
(Continued)

FOREIGN PATENT DOCUMENTS

KR 10-2023-0008494 A 1/2023
KR 10-2023-0048906 A 4/2023

OTHER PUBLICATIONS

Office Action dated May 10, 2024 in Korean Application No. 10-2024-0030507, in 5 pages.
(Continued)

*Primary Examiner* — Marcus E Windrich
(74) *Attorney, Agent, or Firm* — Knobbe, Martens, Olson & Bear, LLP

(57) ABSTRACT

Proposed is a method for providing engagement information. The method may include obtaining detection information related to an aircraft detected by radar, and obtaining preliminary information including information on enemy units, friendly units, and friendly facilities. The method may also include determining whether the aircraft is performing non-linear maneuver including pull up maneuver from the detection information and the preliminary information using a pre-trained neural network, and predicting an impact point of the aircraft based on whether the non-linear maneuver of the aircraft are performed. The method may further include generating an engagement strategy for the aircraft to display an intercept point based on the impact point. The determining whether the aircraft is performing the non-linear maneuver may include predicting a timing of the non-linear maneuver based on location information of a target aimed at by the aircraft.

18 Claims, 7 Drawing Sheets

(56) References Cited

U.S. PATENT DOCUMENTS

| | | | | |
|---|---|---|---|---|
| 2010/0264216 | A1* | 10/2010 | Kenefic | F42B 15/01<br>235/400 |
| 2019/0323807 | A1* | 10/2019 | Smith | G01S 5/0246 |
| 2023/0358509 | A1* | 11/2023 | Rubinraut | F42B 15/01 |

OTHER PUBLICATIONS

Translation of Office Action dated May 10, 2024 in Korean Application No. 10-2024-0030507, in 10 pages.
Notice of Allowance dated Sep. 23, 2024 in Korean Application No. 10-2024-0030507, in 10 pages.

* cited by examiner

METHOD AND DEVICE FOR PROVIDING ENGAGEMENT INFORMATION BASED ON OCCURRENCE OF NON-LINEAR MANEUVER OF AIRCRAFT, AND STORAGE MEDIUM STORING INSTRUCTIONS TO PERFORM METHOD FOR PROVIDING ENGAGEMENT INFORMATION

CROSS-REFERENCE TO RELATED APPLICATION

This application claims priority to Korean Patent Application No. 10-2024-0030507 filed on Mar. 4, 2024. The entire contents of the application on which the priority is based are incorporated herein by reference.

TECHNICAL FIELD

The present disclosure relates to a method and device for predicting a point of impact of a detected aircraft by identifying whether the aircraft is performing non-linear maneuver, and providing engagement information based on a friendly interception system.

BACKGROUND

A typical ballistic missile goes into free fall when reaching its peak altitude after launch, and its trajectory draws a parabolic curve by utilizing a guidance function near the target. In contrast, missiles capable of non-linear maneuver do not move parabolically like regular ballistic missiles, but rather have the characteristic of rising through propulsion by lifting their heads and flying in a horizontal direction when reaching a mid- or low-altitude in the descent phase. Accordingly, ballistic missiles capable of non-linear maneuver have difficulty predicting a point of impact compared to the typical ballistic missiles.

SUMMARY

An embodiment of the present disclosure proposes a technology that predicts a point of impact for a non-linear maneuvering aircraft (for example, a ballistic missile) and recommends an engagement strategy based on a friendly interception system at the predicted point of impact.

An embodiment of the present disclosure proposes a plan for providing engagement information by predicting non-linear maneuver timing of an aircraft capable of non-linear maneuver.

The aspects of the present disclosure are not limited to the foregoing, and other aspects not mentioned herein will be clearly understood by those skilled in the art from the following description.

In accordance with an aspect of the present disclosure, there is provided a method for providing engagement information performed by an engagement information providing apparatus, the method comprises: obtaining detection information related to an aircraft detected by radar; obtaining preliminary information including information on enemy units, friendly units, and friendly facilities; determining whether the aircraft is performing non-linear maneuver including pull up maneuver from the detection information and the preliminary information using a pre-trained neural network; predicting an impact point of the aircraft based on whether the non-linear maneuver of the aircraft are performed; and generating an engagement strategy for the aircraft to display an intercept point based on the impact point, wherein the determining whether the aircraft is performing the non-linear maneuver includes predicting a timing of the non-linear maneuver based on location information of a target aimed at by the aircraft.

Additionally, the predicting the timing of the non-linear maneuver may include determining a timing when the aircraft approaches a preset distance from the location information of the target as the timing of the non-linear maneuver.

Additionally, the target may be set based on priority of information on the friendly units and friendly facilities.

Additionally, the predicting the timing of the non-linear maneuver may include predicting the timing of the non-linear maneuver of the aircraft based on the location information of the target with a highest priority using the priority of information on the friendly units and friendly facilities.

Additionally, the generating the engagement strategy may include predicting the intercept point in a glide section of the aircraft based on the predicted timing of the non-linear maneuver, and displaying the predicted intercept point in the glide section of the aircraft.

Additionally, the generating the engagement strategy may include predicting an auxiliary intercept point in a horizontal glide flight section after the non-linear maneuver of the aircraft based on the predicted timing of the non-linear maneuver, and displaying the predicted auxiliary intercept point in the horizontal glide flight section.

Additionally, the obtaining the detection information may include extracting dynamic characteristic information of the aircraft detected by the radar by replaying a video including the detected aircraft.

Additionally, the dynamic characteristic information may include at least one of a launch point of the aircraft, movement locations of the aircraft, a movement trajectory of the aircraft, a speed of the aircraft, an acceleration of the aircraft, or a Radar Cross Section (RCS) of the aircraft.

Additionally, the neural network may be trained by discriminating whether the aircraft is performing the non-linear maneuver corresponding to the detection information and the dictionary information, wherein the neural network may include an input layer for inputting a training detection information and a training preliminary information, an output layer for setting training label information specifying whether the aircraft is performing the non-linear maneuver; and a model parameter for a correlation between the training detection information and the training preliminary information with respect to an occurrence of the non-linear maneuver of the training label information using a supervised learning algorithm.

Additionally, the obtaining the detection information may include extracting dynamic characteristic information of the aircraft detected by the radar by replaying a video including the detected aircraft; and wherein the training detection information may include the extracted dynamic characteristic information.

In accordance with another aspect of the present disclosure, there is provided a device for providing engagement information, the device comprises: a communication unit configured to obtain detection information related to an aircraft detected by radar, and preliminary information including information on enemy units, friendly units, and friendly facilities; a memory configured to store one or more instructions; and a processor configured to execute the one or more instructions stored in the memory, wherein the instructions, when executed by the processor, cause the processor to: determine whether the aircraft is performing non-linear maneuver including pull up maneuver from the detection information and the preliminary information using a pre-trained neural network; predict an impact point of the aircraft based on whether the non-linear maneuver of the aircraft are performed; and generate an engagement strategy for the aircraft to display an intercept point based on the impact point, wherein the processor is configured to predict a timing of the non-linear maneuver based on location information of a target aimed at by the aircraft.

Additionally, the processor may be configured to determine a timing when the aircraft approaches a preset distance from the location information of the target as the timing of the non-linear maneuver.

Additionally, the target may be set based on priority of information on the friendly units and friendly facilities.

Additionally, the processor may be configured to predict the timing of the non-linear maneuver of the aircraft based on the location information of the target with a highest priority using the priority of information on the friendly units and friendly facilities.

Additionally, the processor may be configured to predict the intercept point in a glide section of the aircraft based on the predicted timing of the non-linear maneuver, and display the predicted intercept point in the glide section of the aircraft.

Additionally, the processor may be configured to predict an auxiliary intercept point in a horizontal glide flight section after the non-linear maneuver of the aircraft based on the predicted timing of the non-linear maneuver, and display the predicted auxiliary intercept point in the horizontal glide flight section.

Additionally, the neural network may be trained by discriminating whether the aircraft is performing the non-linear maneuver corresponding to the detection information and the dictionary information, and wherein the neural network may include an input layer for inputting a training detection information and a training preliminary information, an output layer for setting training label information specifying whether the aircraft is performing the non-linear maneuver; and a model parameter for a correlation between the training detection information and the training preliminary information with respect to an occurrence of the non-linear maneuver of the training label information using a supervised learning algorithm.

Additionally, the processor may be configured to extract dynamic characteristic information of the aircraft detected by the radar by replaying a video including the detected aircraft; and wherein the training detection information may include the extracted dynamic characteristic information.

In accordance with another aspect of the present disclosure, there is provided a non-transitory computer readable storage medium storing computer executable instructions, wherein the instructions, when executed by a processor, cause the processor to perform a method for providing engagement information, the method comprise: obtaining detection information related to an aircraft detected by radar; obtaining preliminary information including information on enemy units, friendly units, and friendly facilities; determining whether the aircraft is performing non-linear maneuver including pull up maneuver from the detection information and the preliminary information using a pre-trained neural network; predicting an impact point of the aircraft based on whether the non-linear maneuver of the aircraft are performed; and generating an engagement strategy for the aircraft to display an intercept point based on the impact point, wherein the determining whether the aircraft is performing the non-linear maneuver includes predicting a timing of the non-linear maneuver based on location information of a target aimed at by the aircraft.

An embodiment of the present disclosure is capable of discriminating whether the aircraft is performing non-linear maneuver based on detection information related to the aircraft detected by radar and preliminary information including information on enemy units, friendly units, and friendly facilities. Accordingly, by utilizing launch point-based unit information, ammunition type information, maximum flight distance, etc., the expected non-linear maneuver location is predicted according to the predefined target priority on a flight path based on the expected maximum flight distance of the aircraft. Even when the aircraft is maneuvered below the loss altitude of radar, it may be recognized as the same track and interception may be possible. In addition, according to an embodiment of the present disclosure, by predicting the point of impact of an aircraft capable of non-linear maneuver by predicting the non-linear maneuver timing of the aircraft, a more accurate engagement strategy may be recommended.

DETAILED DESCRIPTION

Figure 1:
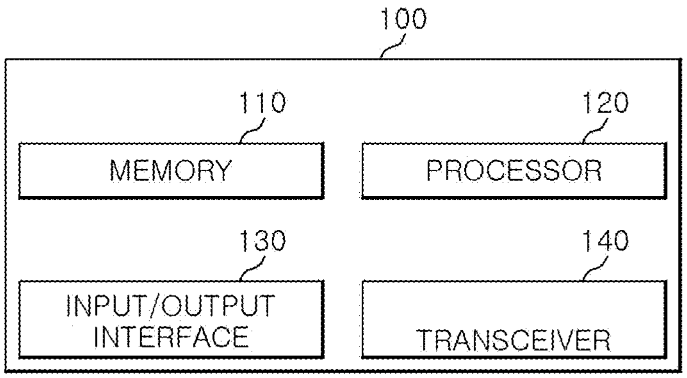
FIG. 1 is a functional block diagram of an engagement information providing apparatus according to an embodiment of the present disclosure.

Among the ballistic missiles owned by North Korea, the ballistic missiles that may perform non-linear maneuver, such as the Iskander, have limitations in responding with the conventional detection/interception system. After the launch of the KN-23, a new tactical missile in North Korea, analysis materials and articles thereabout revealed that the KN-23 performed additional propulsion maneuver below a radar loss altitude (shaded area or radar detection restricted area), rather than the parabolic flight of the typical ballistic missiles.

A missile capable of such non-linear maneuver is likely to evade interceptor missiles such as Patriot (PAC-3) and missile defense radars. Accordingly, detecting or intercepting non-linear maneuvering ballistic missiles has limitations with conventional force integrated systems, and technology capable of addressing this issue is required.

A non-linear maneuvering aircraft is difficult to detect because of a detection radar loss attitude formed by a curved surface of the Earth. Due to the round curved surface of the Earth, when a missile descends below a certain altitude, it is difficult for the Green Pine radar deployed in Korea to detect the missile. The altitude in this connection is called 'radar loss altitude.' For this reason, detection is not easy when the missile flies below a certain altitude (loss altitude).

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

There are examples of missile launches with additional non-linear maneuver below a radar loss altitude (shaded area or radar detection restricted area), rather than the curved (parabolic) flight of the typical ballistic missiles. This is a new short-range ballistic missile with flight characteristics similar to the Iskander missile in Russia.

A typical ballistic missile goes into free fall when reaching its peak altitude after launch, and its trajectory draws a parabolic curve by utilizing a guidance function near the target. In contrast, the KN-23 in North Korea and the Iskander in Russia perform a pull-up maneuver of lifting their heads and flying in a horizontal direction when reaching a mid-or low-altitude in the descent phase, and then drop vertically from above the target to intercept the target. This increases the possibility of evading interceptor missiles such as Patriot (PAC-3) and missile defense radars.

As such, detecting or intercepting non-linear maneuvering ballistic missiles has limitations with current force integrated systems, and thus a plan to address this issue is needed.

Accordingly, an embodiment of the present disclosure proposes a technical plan that allows an aircraft to be recognized as the same track and intercepted even when the aircraft maneuver below the radar loss altitude by utilizing preliminary information (launch point-based unit information, ammunition type information, maximum flight distance, etc.) to predict the expected location of non-linear maneuver according to the predefined target priority on a flight path based on the expected maximum flight distance of the aircraft.

In addition, an embodiment of the present disclosure proposes a technical plan that practically and accurately recommends an engagement strategy for an aircraft by predicting a point of impact of the aircraft by predicting the non-linear maneuver timing of the aircraft in predicting the expected non-linear maneuver location.

Hereinafter, embodiments of the present disclosure will be described in detail with reference to the attached drawings.

FIG. 1 is a functional block diagram of an engagement information providing apparatus 100 according to an embodiment of the present disclosure.

Referring to FIG. 1, the engagement information providing apparatus 100 according to an embodiment of the present disclosure may include a memory 110, a processor 120, an input/output interface 130, and a transceiver 140.

The memory 110 may store data acquired from an external device or data generated by itself. The memory 110 may store commands that may cause the processor 120 to perform operations. The memory 110 may store detection information, preliminary information, and neural networks, which will be described later. To this end, the neural network in the memory 110 may be pre-trained to use label data as information specifying whether an aircraft is performing non-linear maneuver, input the detection information (information related to an aircraft) acquired in real time and the preliminary information (information related to auxiliary facilities) as learning data, and output a result of discriminating whether the aircraft is performing non-linear maneuver. Any commands in the memory 110 may be stored in the memory 110 in the form of applications, programs, etc., and any stored commands may be selected and performed by the processor 120. The memory 110 may include, for example, memory such as random access memory (RAM) and read only memory (ROM), and recording media such as local disks and storage connected to a network. There is no need to be limited to a specific recording medium in implementing the embodiments of the present disclosure.

The processor 120 is an arithmetic device that controls overall operations. The processor 120 may execute commands stored in the memory 110. The operation of the engagement information providing apparatus 100 according to an embodiment of the present disclosure may be understood as an operation performed by the processor 120. The processor 120 may perform processes to acquire detection information and preliminary information through the transceiver 140 by performing commands in the memory 110, and may discriminate a point of impact of an aircraft based on the non-linear maneuver discrimination result output through the neural network in the memory 110 and process the same to recommend an engagement strategy. The processor 120 may include, for example, a microprocessor-based processing device, and the specific configuration and function of the processor 120 will be described in detail in FIGS. 2 to 7 described later.

The input/output interface 130 may include a hardware interface or a software interface that inputs or outputs information. The input function in the input/output interface 130 may provide a user interface (UI) environment for selecting an information acquisition command, a discrimination command, a recommendation command, etc. This input function may include, for example, an input member such as a keypad or touch pad. The output function in the input/output interface 130 may provide a UI environment for outputting image information, etc. corresponding to an arbitrary command selected through the UI environment. This output function may include, for example, a display member such as a liquid crystal display (LCD) or organic light emitting diodes (OLED), and does not need to be limited to a specific display member.

The transceiver 140 allows information to be transmitted and received through a network. To this end, the transceiver 140 may include a wireless communication module or a wired communication module. For example, the transceiver 140 may be linked to a radar system that will be described later.

The engagement information providing apparatus 100 may be implemented as various types of electronic devices capable of performing calculations through the processor 120 and transmitting and receiving information through a network. In embodiments of the present disclosure, the electronic devices may include, for example, at least one of a smartphone, a tablet personal computer (PC), an e-book reader, a laptop personal computer (PC), a netbook computer, or a wearable device. In other embodiments, the electronic devices may include at least one of network security equipment, navigation devices, marine electronic equipment (for example, marine navigation devices, gyro compasses, etc.), avionics, vehicle head units, or Internet of Things devices. Additionally, the electronic device may be equipped with an application to execute various operations (screen output, information transmission/reception operations, etc.) for providing engagement information. The application may include, for example, smartphone applications, personal computer (PC) applications, set-top box (STB) applications, web applications, instant applications, etc., and do not need to be limited to specific applications. In addition, a network for transmitting and receiving information is equipment that connects an electronic device to another electronic device or an external server. These networks may include, for example, short-range communication networks such as Bluetooth, Zigbee, Wi-Fi, and ultra-wide band (UWB), and broadband communication networks such as the Internet and mobile communication networks. There is no need to be limited to a specific network.

Figure 2:
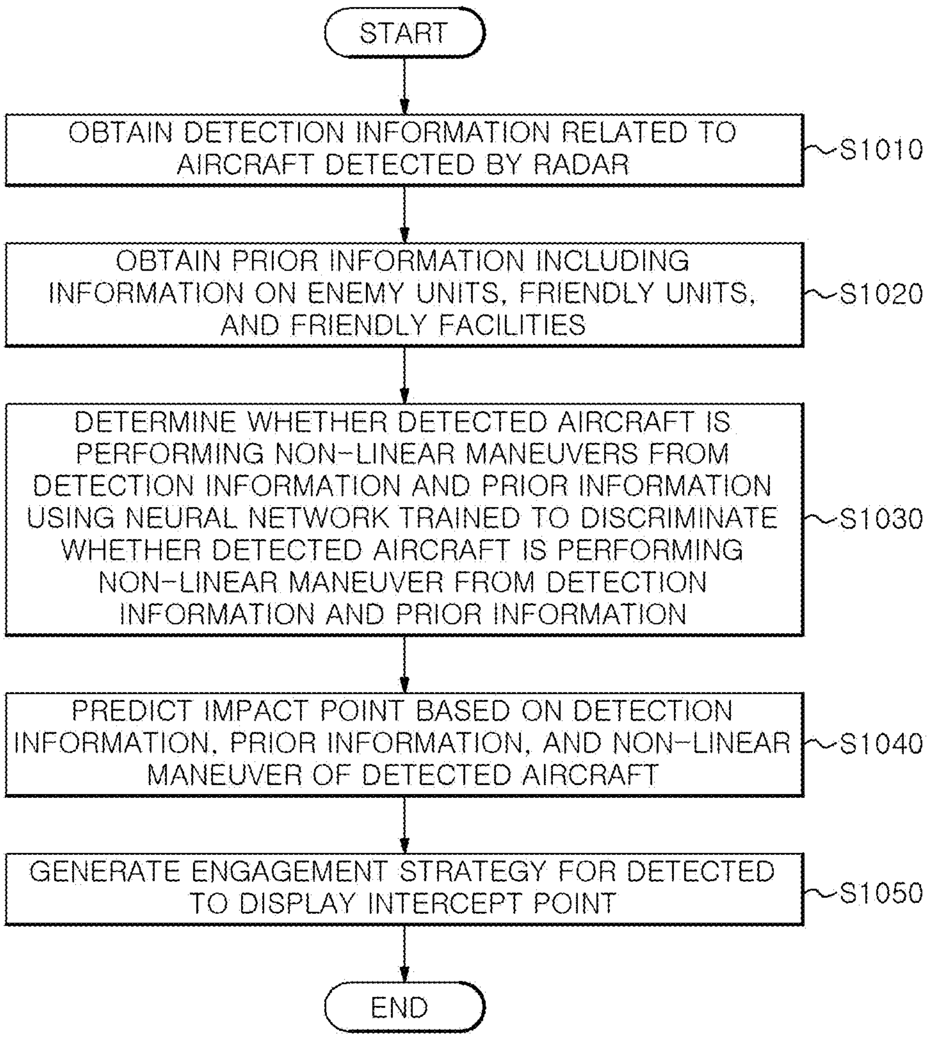
FIG. 2 is a flowchart of operations performed by the engagement information providing apparatus according to an embodiment of the present disclosure.

FIG. 2 is a flowchart of operations performed by the engagement information providing apparatus 100 according to an embodiment of the present disclosure. The operation of the engagement information providing apparatus 100 according to the embodiment of FIG. 2 may be understood as an operation performed by the processor 120. Each stage described in FIG. 2 is merely a preferred embodiment in achieving the purpose of the present disclosure, and some stages may be added or deleted as necessary, and one stage may be performed by being included in another stage. The order of each operation described in FIG. 2 is merely an order arranged for convenience of understanding, and this order is not limited to a time-serial order, and the order may be changed and the operations may be operated differently depending on the selection of a designer.

Referring to FIG. 2, in stage S1010, the engagement information providing apparatus 100 may acquire detection information. For example, the detection information may include information related to an aircraft (for example, a ballistic missile) detected by a radar system. Herein, the radar system is a system that detects an object and determines its direction, distance, speed, etc. by measuring the reflected wave that returns after the irradiated electromagnetic wave hits the object. The engagement information providing apparatus 100 may be linked to the radar system through the transceiver 140 and may acquire information on the detected aircraft.

As an example, the detection information may include information on an image of the detected aircraft. In this connection, the engagement information providing apparatus 100 may replay the image of the aircraft detected by the radar and extract dynamic characteristic information of the detected aircraft. For example, the apparatus may replay images of aircraft detected through radar and extract information on a launch point, movement location, movement trajectory, speed, acceleration, and RCS of the detected aircraft using various image detection algorithms.

In stage S1020, the engagement information providing apparatus 100 may acquire preliminary information including information on enemy units, friendly units, and friendly facilities. For example, the preliminary information may be input through the input/output interface 130 or the transceiver 140.

For example, the information on enemy units may include information such as the location of the missile unit of enemy forces, the type of ammunition in operation, the warheads that may be mounted for each type of ammunition, the range of ammunition, the weight that may be mounted on the ammunition, the number of ammunition units, the number of launchers, and the type of fuel (for example, solid, liquid). The information on enemy units may be utilized to determine whether there will be non-linear maneuver in a stage that will be described later. The engagement information providing apparatus 100 predicts the launch point and point of impact based on detection information input to a neural network model to be described later, so that it is possible to infer from which unit the launched ballistic missile was launched, and to probabilistically predict whether the detected aircraft is a type of ammunition capable of non-linear maneuver based on the type and quantity of ammunition being operated by the unit. Moreover, the probability of non-linear maneuver of the aircraft may be updated by utilizing the trajectory of the aircraft and various pieces of dynamic characteristic information.

For example, the information on friendly units may include friendly area information such as friendly detection radars, interception units, command posts, military airfields, military ports, and other military-related facilities. In addition, the information on friendly units may include specific information on each friendly area, such as the location of friendly forces, performance of detection radar (for example, detection range, restricted detection area, etc.), availability of interception units, and performance and specifications (for example, range, altitude, speed, etc.), the number of interceptor missiles, etc. of the interceptor missiles being operated by the interception unit.

For example, the information on friendly facilities may include areas and facilities that may cause confusion or cause significant casualties in an emergency as target areas for the detected aircraft (for example, airports, power plants, radar bases, interception units, command posts, communication facilities, roads, dams, densely populated areas, and private facilities, etc.). The information on friendly facilities may include terrain-based information, and GARS (Global Area Reference System) coordinates may be utilized to distinguish the friendly area and include information representing the population layer and facility layer for each coordinate.

In stage S1030, the engagement information providing apparatus 100 may use a neural network trained to discriminate whether the aircraft is performing non-linear maneuver from the detection information and preliminary information to discriminate whether the detected aircraft is performing non-linear maneuver from the detection information acquired in stage S1010 and the preliminary information acquired in stage S1020.

Figure 3:
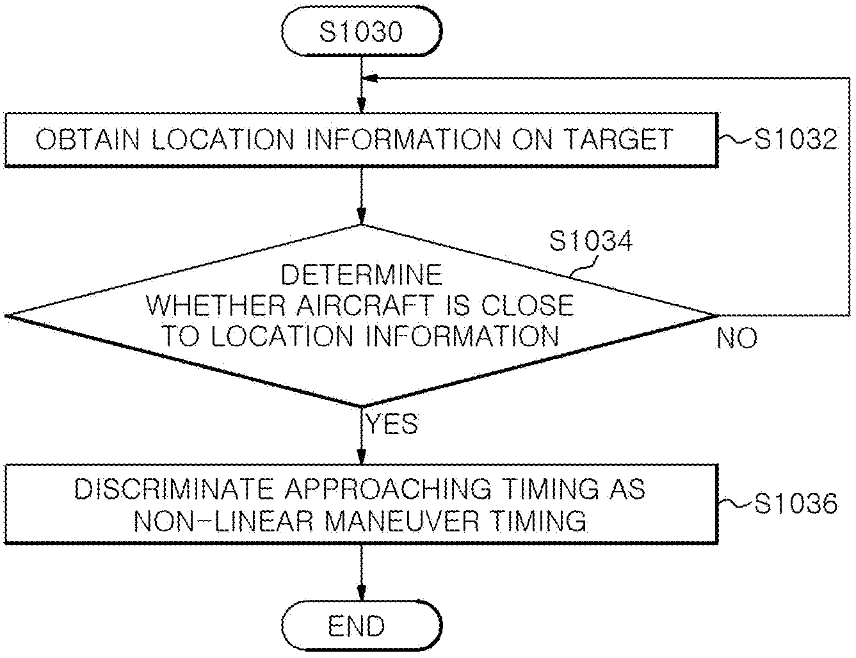
FIG. 3 is a flowchart illustrating a specific operation process of determining whether the aircraft is performing non-linear maneuver in an engagement information providing process performed by the engagement information providing apparatus according to an embodiment of the present disclosure.

FIG. 3 is a flowchart illustrating a specific operation process (S1030) of discriminating whether the aircraft is performing non-linear maneuver in an engagement information providing process performed by the engagement information providing apparatus 100 according to an embodiment of the present disclosure.

As illustrated in FIG. 3, the engagement information providing apparatus 100 may acquire location information on the target targeted by the aircraft (S1032).

Thereafter, the engagement information providing apparatus 100 may determine whether the aircraft is close to the location information (S1034). For example, the engagement information providing apparatus 100 may determine whether the aircraft approaches a preset distance from the location information.

Thereafter, the engagement information providing apparatus 100 may discriminate timing when the aircraft approaches a preset distance from the location information as the non-linear maneuver timing of the aircraft (S1036).

Herein, the target targeted by the aircraft may be set based on the priority of information on friendly units and friendly facilities.

Figure 4:
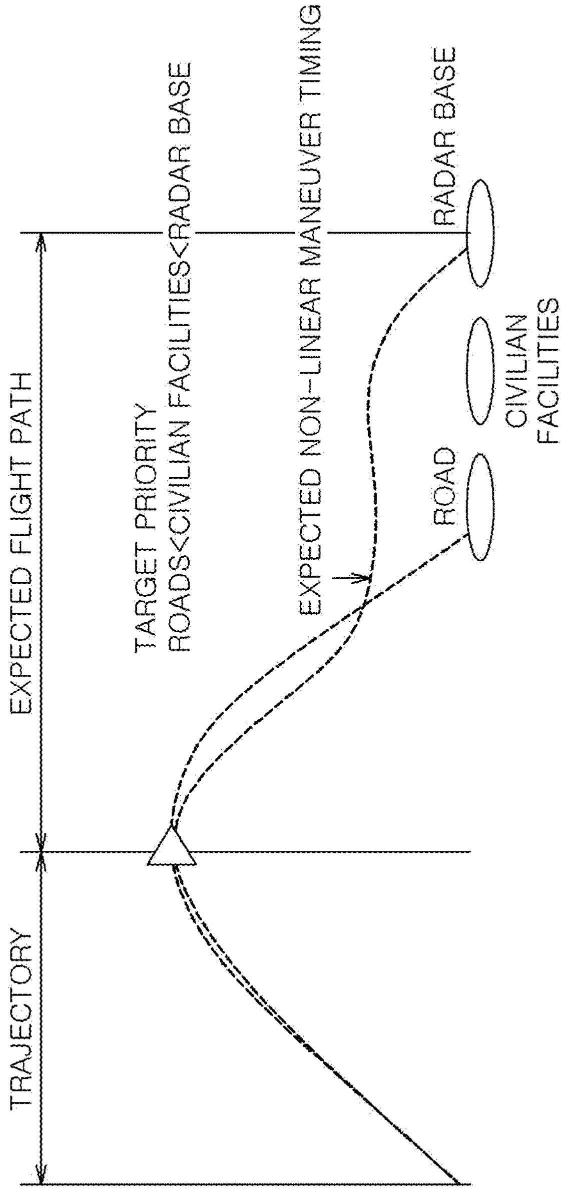
FIG. 4 is a diagram illustrating a process for predicting non-linear maneuver timing to discriminate whether non-linear maneuver of FIG. 3 are performed.

FIG. 4 is a diagram illustrating a process for predicting non-linear maneuver timing to discriminate whether non-linear maneuver of FIG. 3 are performed.

In other words, when non-linear maneuver of a high-speed aircraft are possible as illustrated in FIG. 4, target prediction may target the target with the highest priority among the predefined priorities on the expected flight path based on trajectory and maximum range, etc. Since non-linear maneuver is utilized to avoid interceptor missiles and detection radars, there is a high probability of non-linear maneuver near the target. This may be inferred more accurately by learning the trajectory of non-linear maneuver near the target through learning of a neural network.

The prediction of the non-linear maneuver timing based on this priority may include, for example, prediction of the non-linear maneuver timing of the aircraft based on the location information of the target with the highest priority among the priorities. For example, as illustrated in FIG. 4, when there is a radar base on the expected flight path and there is a civilian facility in front, the non-linear maneuver to attack the civilian facility are different from the non-linear maneuver to attack the radar base, which may be identified more clearly through various machine learning methods.

As such, when the non-linear maneuver timing of the aircraft are predicted and non-linear maneuver are discriminated, the engagement information providing apparatus 100 may discriminate the point of impact of the aircraft based on the detection information of the aircraft, preliminary information, and the result of discriminating whether the aircraft is performing non-linear maneuver, and may recommend an engagement strategy for the aircraft based on the point of impact.

In other words, by deducing the target and inferring the non-linear maneuver timing, it will be possible to intercept such a non-linear maneuvering aircraft in the gliding section or the horizontal gliding flight section after non-linear maneuver.

Figure 5:
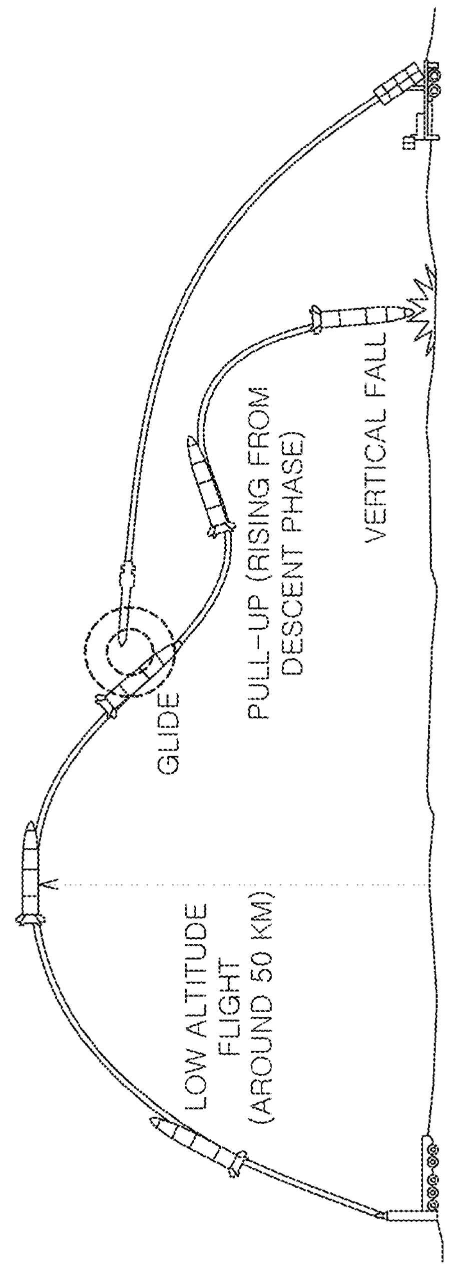
FIG. 5 is a diagram illustrating a process of predicting the non-linear maneuver timing of FIG. 4 and recommending an interception spot.

FIG. 5 is a diagram illustrating a process of predicting the non-linear maneuver timing of FIG. 4 and recommending an interception spot.

Recommendation of an intercept point may, for example, predict a non-linear maneuver timing and recommend an interception spot in the glide section of the aircraft. In this connection, interception is possible in the section where the aircraft is gliding through a friendly launcher.

Alternatively, for the recommendation of the interception spot, for example, when the recommendation of the interception spot in the glide section fails, the non-linear maneuver timing may be predicted and the interception spot in the horizontal gliding flight section after the non-linear maneuver of the aircraft may be recommended. In this connection, interception in the horizontal gliding flight section is possible before the aircraft falls vertically through the friendly launcher.

As a result of analyzing the flight trajectory of the KN-23 launched so far, the highest altitude (peak altitude) was analyzed to be 50 to 60 km and the maximum flight distance (range) was analyzed to be 600 to 690 km. Utilizing this information, a scenario of intercepting an aircraft in a gliding section may be assumed, as illustrated in FIG. 5. For interception, an interception spot may be recommended utilizing the range, direction, angle, hot inventory, and altitude of interceptor weapons of friendly forces.

The neural network utilized in an embodiment of the present disclosure to provide engagement information based on the non-linear maneuver timing of the aircraft may include a neural network model designed based on a deep neural network, including an input layer, a hidden layer, and an output layer.

Figure 6:
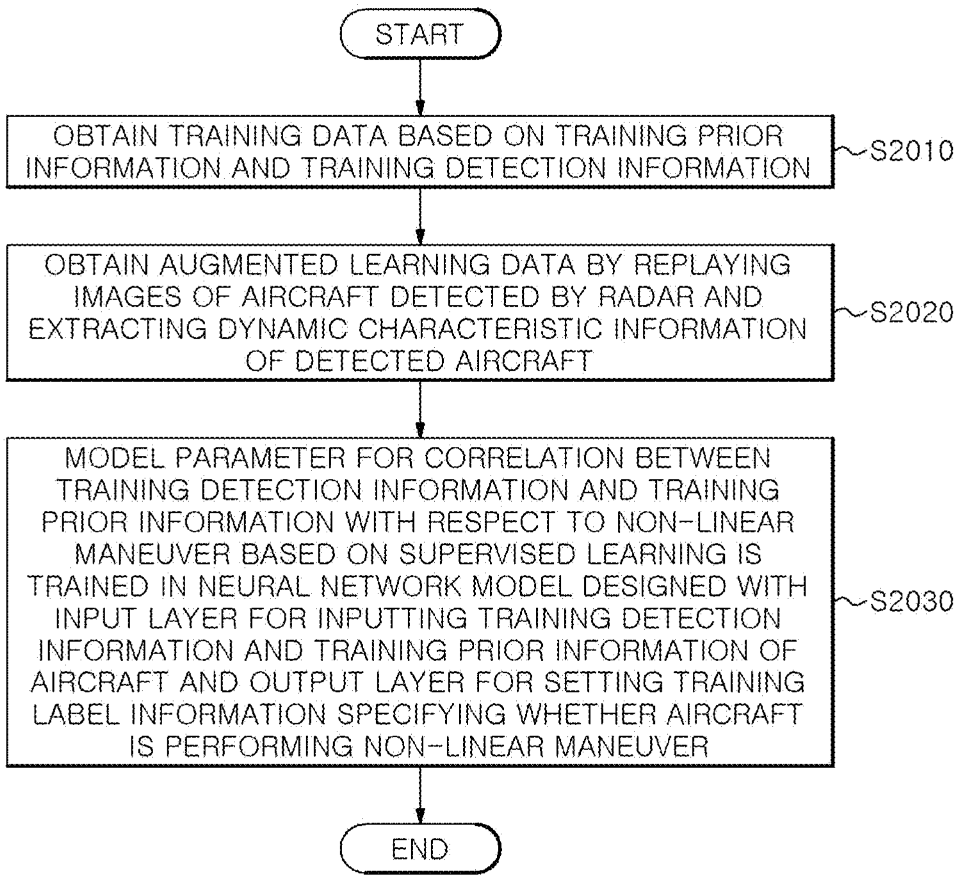
FIG. 6 is a flowchart of an operation in which the engagement information providing apparatus trains a neural network according to an embodiment of the present disclosure.

FIG. 6 is a flowchart of an operation in which the engagement information providing apparatus 100 trains a neural network according to an embodiment of the present disclosure. The operation of the engagement information providing apparatus 100 according to the embodiment of FIG. 6 may be understood as an operation performed by the processor 120. Each stage described in FIG. 6 is merely a preferred embodiment in achieving the purpose of the present disclosure, and some stages may be added or deleted as necessary, and one stage may be performed by being included in another stage. The order of each operation described in FIG. 6 is merely an order arranged for convenience of understanding, and this order is not limited to a time-serial order, and the order may be changed and the operations may be operated differently depending on the selection of a designer.

Referring to FIG. 6, in stage S2010, the engagement information providing apparatus 100 may acquire learning data based on preliminary information and detection information from an external database.

Additionally, in stage S2010, the engagement information providing apparatus 100 may use augmented learning data by utilizing detection information previously detected by a radar. For example, the engagement information providing apparatus 100 may extract dynamic characteristic information of the aircraft by replaying an image of the aircraft detected by the radar, as described in stage S1010, and may augment and utilize the extracted dynamic characteristic information as learning data for detection information to be input to the input layer.

In stage S2030, the neural network of the engagement information providing apparatus 100 may be set to input the detection information and preliminary information of the aircraft as input data to the input layer in the learning stage, and may be set to output class information that specifies whether the aircraft performs non-linear maneuver according to the information input to the input layer as output data. To this end, the neural network may train the model parameters of the hidden layer to have a correlation between the detection information and preliminary information input to the input layer and the class for non-linear maneuver input to the output layer based on supervised learning. Additionally, the loss function of the neural network may be set as the difference between the class for non-linear maneuver used for learning and the prediction probability for non-linear maneuver output as a prediction of the neural network.

In stage S1030, when some pieces of the detection information among a plurality of pieces of detection information to be input to the neural network is unspecified, the engagement information providing apparatus 100 assigns some pieces of the unspecified detection information to a preset value or a random value to input some pieces of detection information to the neural network model.

According to an additional embodiment, the operations of stages S1010 and S1030 may be performed by updating detection information at preset periods. For example, since radar information has dynamic characteristics that change over time, the operation of S1010 may be performed at preset periods, and the detection information may be updated at preset periods. Accordingly, the operation of stage S1030 is also performed at preset periods, so that the value output by the neural network model may be updated at preset periods. For example, the engagement information providing apparatus 100 may use the neural network to discriminate whether the detected aircraft is performing non-linear maneuver based on detection information updated at preset periods and acquired preliminary information. Accordingly, the engagement information providing apparatus 100 may synthesize a plurality of probability values output by the neural network at each preset period in various ways, and compare the probability calculated by the synthesis with the threshold value of the preset standard, so as to re-discriminate whether the detected aircraft is a non-linear maneuvering aircraft.

For example, the engagement information providing apparatus 100 may derive a comprehensive probability value that synthesizes the plurality of probability values by assigning a relatively higher weight to the probability value calculated in the most recent period among the plurality of probability values calculated by the neural network model for each preset period as shown in Equation 1 below.

$$\sum_{k=1}^{n} \text{Probability value calculated in } k \text{ period} \times k \text{ period weighted value} \qquad \text{EQUATION 1}$$

Herein, k may be information identifying which period it is, n may represent the total period, and the k period weighted value may be expressed as k/100.

For example, when the 1st period probability is 30%, the 2nd period probability is 50%, and the 3rd period probability is 80%, a weighted value of 0.3 is given to the 3rd period, a weighted value of 0.2 is given to the 2nd period, and a weighted value of 0.1 is given to the 1st cycle, so that the overall probability value may be calculated as 0.3*0.1+0.5*0.2+0.8*0.3.

In stage S1040, the engagement information providing apparatus 100 may discriminate the point of impact based on detection information, preliminary information, and non-linear maneuver of the detected aircraft. For example, the engagement information providing apparatus 100 may discriminate: detection information such as the current location and trajectory of the aircraft; preliminary information such as launch point, range, and friendly forces/ally information; and the point of impact of the aircraft based on the identification result of non-linear maneuver. The process of discriminating the point of impact in stage S1040 may be predefined according to preliminary information of each unit. For example, the location of the point of impact when an aircraft capable of non-linear maneuvering is currently at a specific location may be predefined according to preliminary information.

Additionally, the priority of the point of impact may be predefined as shown in [Table 1] below.

TABLE 1

| Priority | Point of impact |
|---|---|
| 1 | Detection radar |
| 2 | Interception unit |
| 3 | Military command post |
| 4 | Military airfield, military port |
| 5 | Densely populated areas |

In addition, as the determination of whether non-linear maneuver is performed for each period is updated according to the aforementioned additional embodiment, the point of impact of stage S1040 may also be updated.

In stage S1050, the engagement information providing apparatus 100 may recommend a preset engagement strategy that may be implemented at the point of impact based on information from a friendly interception system.

For example, when the detected aircraft is discriminated to be unable to perform non-linear maneuver, the engagement information providing apparatus 100 may predict a free fall point of the parabolic motion based on the current location of the detected aircraft as the point of impact and recommend an engagement strategy. Additionally, in stage S1050, when the detected aircraft is discriminated to be capable of non-linear maneuver, the engagement information providing apparatus 100 may recommend an engagement strategy by predicting the information-based non-linear maneuver timing of the detected aircraft.

Figure 7:
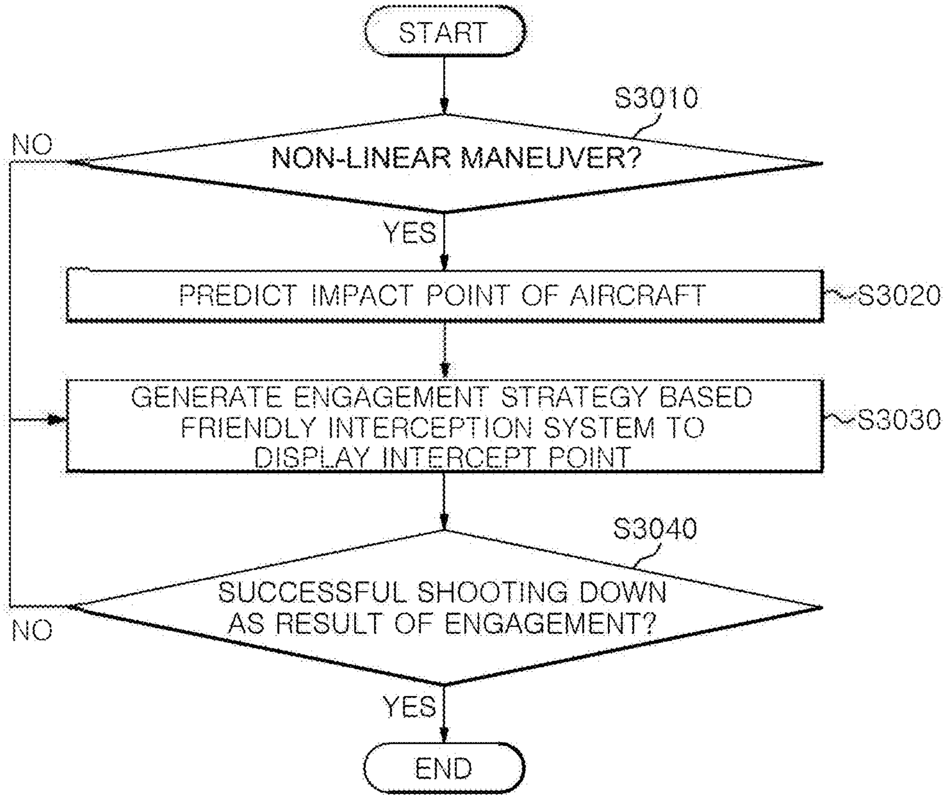
FIG. 7 is a flowchart of an operation in which the engagement information providing apparatus 100 recommends an engagement strategy depending on whether the aircraft is performing non-linear maneuver according to an embodiment.

Assuming actual use, an embodiment specifying the operations of stages S1040 and S1050 is shown in FIG. 7 below.

FIG. 7 is a flowchart of an operation in which the engagement information providing apparatus 100 recommends an engagement strategy depending on whether the aircraft is performing non-linear maneuver according to an embodiment. The operation of the engagement information providing apparatus 100 according to the embodiment of FIG. 7 may be understood as an operation performed by the processor 120. Each stage described in FIG. 7 is merely a preferred embodiment in achieving the purpose of the present disclosure, and some stages may be added or deleted as necessary, and one stage may be performed by being included in another stage. The order of each operation described in FIG. 7 is merely an order arranged for convenience of understanding, and this order is not limited to a time-serial order, and the order may be changed and the operations may be operated differently depending on the selection of a designer.

Referring to FIG. 7, in stage S3010, the engagement information providing apparatus 100 may distinguish the next operation to be performed according to the result of the neural network discriminating whether the aircraft is in non-linear maneuver.

When it is discriminated that the vehicle is capable of non-linear maneuver, in stage S3020, the engagement information providing apparatus 100 may predict the point of impact of the aircraft by predicting the non-linear maneuver timing based on information such as the current location and maximum range of the aircraft. Thereafter, in stage S3030, the engagement information providing apparatus 100 may recommend engagement in consideration of the range, altitude, availability, etc. at which interception systems of friendly forces may intercept. Next, in stage S3040, when the aircraft is successfully shot down as a result of the engagement according to the recommendation system, the operation is terminated, and when it is not shot down, stage S3030 may be performed again.

When the aircraft is discriminated to be unable to perform non-linear maneuver, in stage S3030, the engagement information providing apparatus 100 may recommend an engagement strategy by predicting the free fall point of the parabolic motion based on the current location of the detected aircraft as the point of impact. Next, in stage S3040, when the aircraft is successfully shot down as a result of the engagement according to the recommendation system, the operation is terminated, and when it is not shot down, stage S3030 may be performed again.

According to an embodiment of the present disclosure as described above, non-linear maneuver of the aircraft may be discriminated based on detection information related to the aircraft detected by the radar and preliminary information including information on enemy units, friendly units, and friendly facilities. Accordingly, by utilizing launch point-based unit information, ammunition type information, maximum flight distance, etc., the expected non-linear maneuver location is predicted according to the predefined target priority on a flight path based on the expected maximum flight distance of the aircraft. Even when the aircraft is maneuvered below the loss altitude of radar, it may be recognized as the same track and interception may be possible. In addition, according to an embodiment of the present disclosure, by predicting the point of impact of an aircraft capable of non-linear maneuver by predicting the non-linear maneuver timing of the aircraft, a more accurate engagement strategy may be recommended.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A method for providing engagement information performed by an engagement information providing apparatus including an input/output interface and a communication interface, the method comprising:

obtaining detection information related to an aircraft detected by radar via the communication interface;

obtaining preliminary information including information on enemy units, friendly units, and friendly facilities via the communication interface;

determining whether the aircraft is performing non-linear maneuver including pull up maneuver from the detection information and the preliminary information using a pre-trained neural network;

predicting an impact point of the aircraft based on whether the non-linear maneuver of the aircraft are performed; and generating an engagement strategy for the aircraft to display an intercept point based on the impact point, wherein the engagement strategy includes at least one of an altitude of the aircraft, a range of an interception system, or an availability of the interception system, wherein the determining comprises, in response to the aircraft performing non-linear maneuver, predicting a timing of the non-linear maneuver based on location information of a target aimed at by the aircraft, wherein the location information of the target is obtained via the communication interface, and wherein the generating comprises:

predicting the intercept point in a glide section of the aircraft based on the predicted timing of the non-linear maneuver, wherein the intercept point varies depending on the predicted timing of the non-linear maneuver; and displaying the predicted intercept point in the glide section of the aircraft via the input/output interface.

2. The method of claim 1, wherein the predicting comprises determining a timing when the aircraft approaches a preset distance from the location information of the target as the timing of the non-linear maneuver.

3. The method of claim 2, wherein the target is set based on priority of information on the friendly units and friendly facilities.

4. The method of claim 3, wherein the predicting comprises predicting the timing of the non-linear maneuver of the aircraft based on the location information of the target with a highest priority using the priority of information on the friendly units and friendly facilities.

5. The method of claim 1, wherein the generating comprises:

predicting an auxiliary intercept point in a horizontal glide flight section after the non-linear maneuver of the aircraft based on the predicted timing of the non-linear maneuver; and displaying the predicted auxiliary intercept point in the horizontal glide flight section via the input/output interface.

6. The method of claim 1, wherein obtaining the detection information comprises extracting dynamic characteristic information of the aircraft detected by the radar by replaying a video including the detected aircraft, and wherein the video is generated by post-processing radar signal data to visualize a movement of the aircraft.

7. The method of claim 6, wherein the dynamic characteristic information comprises at least one of a launch point of the aircraft, movement locations of the aircraft, a movement trajectory of the aircraft, a speed of the aircraft, an acceleration of the aircraft, or a radar cross section (RCS) of the aircraft.

8. The method of claim 1, wherein the neural network is trained by discriminating whether the aircraft is performing the non-linear maneuver corresponding to the detection information and the preliminary information, and wherein the neural network comprises:

an input layer for inputting-a training detection information and training preliminary information;

an output layer for setting training label information specifying whether the aircraft is performing the non-linear maneuver; and a model parameter for a correlation between the training detection information and the training preliminary information with respect to an occurrence of the non-linear maneuver of the training label information using a supervised learning algorithm.

9. The method of claim 8, wherein obtaining the detection information comprises extracting dynamic characteristic information of the aircraft detected by the radar by replaying a video including the detected aircraft, wherein the training detection information comprises the extracted dynamic characteristic information, and wherein the video is generated by post-processing radar signal data to visualize a movement of the aircraft.

10. A device for providing engagement information, the device comprising:

a communication interface configured to obtain detection information related to an aircraft detected by radar, and preliminary information including information on enemy units, friendly units, and friendly facilities;

an input/output interface;

a memory configured to store one or more instructions; and one or more processors configured to execute the one or more instructions to:

determine whether the aircraft is performing non-linear maneuver including pull up maneuver from the detection information and the preliminary information using a pre-trained neural network;

predict an impact point of the aircraft based on whether the non-linear maneuver of the aircraft are performed;

generate an engagement strategy for the aircraft to display an intercept point based on the impact point, wherein the engagement strategy includes at least one of an altitude of the aircraft, a range of an interception system, or an availability of the interception system; and in response to the aircraft performing non-linear maneuver, predict a timing of the non-linear maneuver based on location information of a target aimed at by the aircraft, wherein the location information of the target is configured to be obtained via the communication interface, wherein at least one of the one or more processors is configured to:

predict the intercept point in a glide section of the aircraft based on the predicted timing of the non-linear maneuver, wherein the intercept point varies depending on the predicted timing of the non-linear maneuver, and display the predicted intercept point in the glide section of the aircraft via the input/output interface.

11. The device of claim 10, wherein at least one of the one or more processors is configured to determine a timing when the aircraft approaches a preset distance from the location information of the target as the timing of the non-linear maneuver.

12. The device of claim 11, wherein the target is configured to be set based on priority of information on the friendly units and friendly facilities.

13. The device of claim 12, wherein at least one of the one or more processors is configured to predict the timing of the non-linear maneuver of the aircraft based on the location information of the target with a highest priority using the priority of information on the friendly units and friendly facilities.

14. The device of claim 10, wherein at least one of the one or more processors is configured to predict an auxiliary intercept point in a horizontal glide flight section after the non-linear maneuver of the aircraft based on the predicted timing of the non-linear maneuver, and display the predicted auxiliary intercept point in the horizontal glide flight section.

15. The device of claim 10, wherein the neural network is configured to be trained by discriminating whether the aircraft is performing the non-linear maneuver corresponding to the detection information and the preliminary information, and wherein the neural network comprises:

an input layer for inputting-a training detection information and a training preliminary information;

an output layer for setting training label information specifying whether the aircraft is performing the non-linear maneuver; and a model parameter for a correlation between the training detection information and the training preliminary information with respect to an occurrence of the non-linear maneuver of the training label information using a supervised learning algorithm.

16. The device of claim 15, wherein at least one of the one or more processors is configured to extract dynamic characteristic information of the aircraft detected by the radar by replaying a video including the detected aircraft, wherein the training detection information comprises the extracted dynamic characteristic information, and wherein the video is configured to be generated by post-processing radar signal data to visualize a movement of the aircraft.

17. A non-transitory computer readable storage medium storing computer executable instructions, when executed by one or more processors, causing an engagement information providing apparatus including the one or more processors, an input/output interface and a communication interface to perform a method comprising:

obtaining detection information related to an aircraft detected by radar via the communication interface;

obtaining preliminary information including information on enemy units, friendly units, and friendly facilities via the communication interface;

determining whether the aircraft is performing non-linear maneuver including pull up maneuver from the detection information and the preliminary information using a pre-trained neural network;

predicting an impact point of the aircraft based on whether the non-linear maneuver of the aircraft are performed; and generating an engagement strategy for the aircraft to display an intercept point based on the impact point, wherein the engagement strategy includes at least one of an altitude of the aircraft, a range of an interception system, or an availability of the interception system, wherein the determining comprises, in response to the aircraft performing non-linear maneuver, predicting a timing of the non-linear maneuver, wherein the intercept point varies depending on the predicted timing of the non-linear maneuver based on location information of a target aimed at by the aircraft, wherein the location information of the target is obtained via the communication interface, and wherein the generating comprises:

predicting the intercept point in a glide section of the aircraft based on the predicted timing of the non-linear maneuver; and displaying the predicted intercept point in the glide section of the aircraft via the input/output interface.

18. The non-transitory computer readable storage medium of claim 17, wherein the predicting comprises determining a timing when the aircraft approaches a preset distance from the location information of the target as the timing of the non-linear maneuver.

* * * * *